2,805,207

SILVER CATALYSTS

Floyd J. Metzger, Stamford, Conn.

No Drawing. Application August 6, 1953,
Serial No. 372,816

1 Claim. (Cl. 252—476)

This invention relates to improvements in the oxidation of organic compounds and includes an improved method for making a silver catalyst to be used in such an oxidation process.

In the catalytic oxidation of ethylene, the catalyst employed is usually metallic silver, with or without the addition of certain promoting agents, and the silver may be deposited on a support or carrier.

The usual method of preparing the silver catalyst has been to first precipitate the silver as oxide or hydroxide by adding caustic soda or caustic potash to a solution of a soluble salt of silver, filtering off the oxide or hydroxide, washing the precipitate and subsequently slurrying the oxide or hydroxide and laying it on the carrier, with drying and subsequent reduction with hydrogen to metallic silver.

It is an object of the present invention to prepare a silver catalyst in a simple and inexpensive way which will give superior results in the catalytic oxidation of ethylene.

When an attempt is made to oxidize ethylene over a heated silver catalyst, two reactions may occur:

(1)     $C_2H_4 + \frac{1}{2}O_2 \rightarrow C_2H_4O + 32.3$ kg. cal.
(2)     $C_2H_4 + 3O_2 \rightarrow 2CO_2 + 2H_2O + 316.6$ kg. cal.

The first of these reactions results in the production of ethylene oxide, while the second, which is one of complete oxidation, results in the generation of a much larger amount of heat.

From the figures given in the above reactions, it is apparent that the oxidation is largely tied in with the removal of heat from the system and that the efficiency in the production of ethylene oxide is all important. As the yield of ethylene oxide increases and the complete oxidation of the second reaction decreases, the heat generated and which it is necessary to remove is greatly reduced. For example A 50% yield produces about 8,000 kg. cal. per kg. of $C_2H_4O$
A 60% yield produces about 5,500 kg. cal. per kg. of $C_2H_4O$
A 70% yield produces about 3,900 kg. cal. per kg. of $C_2H_4O$
A 75% yield produces about 3,100 kg. cal. per kg. of $C_2H_4O$
An 85% yield produces about 2,000 kg. cal. per kg. of $C_2H_4O$
A theoretical yield about 734 kg. cal. per kg. of $C_2H_4O$ The present invention provides an improved catalyst for use in an oxidation method which enables the yield of ethylene oxide to be increased, with corresponding reduction in the second reaction above and in the heat of reaction formed and which requires removal.

The improved silver catalyst resulting from the present invention is one which is produced without the use of hydrogen. The present invention eliminates entirely the use of hydrogen to produce the metallic silver or mixture of silver and silver oxide catalyst.

According to the present invention, the silver catalyst is made from an amoniacal silver solution which contains the silver in solution, and which is applied to the catalyst carrier in the form of a strong solution; and after applying such solution the carrier thus treated is dried and heated to produce the catalyst without reduction by hydrogen.

When ammonia is added to a neutral solution of a silver salt such as a solution of silver nitrate, there is first produced a white precipitate which rather quickly changes to a brown oxide or hydroxide which is readily soluble on further addition of ammonia. This further addition of ammonia results in the formation of a more or less complex compound or mixture of compunds of the silver or silver salt or silver oxide with ammonia.

I have discovered that when such an ammoniacal silver solution is applied to a carrier and the solution evaporated and gently heated, it produces an excellent and superior silver catalyst for the direct oxidation of ethylene to ethylene oxide.

The carrier on which the catalyst is absorbed and by which it is carried may be carriers such as are commonly used for silver catalysts such as, for example, pumice, silica, alumina, etc. A particularly advantageous catalyst carrier is an aluminum oxide carrier composed essentially of alumina, e. g., around 90% alumina and with the balance essentially silica, with small quantities of impurities, such as the commercial product known as Alundum. The carrier may be in the form of small fragments or spheres or any other form such as the tubular form described in my companion application Serial No. 372,760.

The amount of silver applied to the carrier can be varied, e. g. from less than 2% to 5% or more, but in general an amount around 3% of silver on the weight of the carrier is an advantageous amount.

The preparation of the catalyst with the use of an ammoniacal silver solution has the advantage that relatively strong solutions can be made and applied to the carrier, so that, for example, when an amount of solution of around 10% or 20% of the weight of the carrier is used and applied, it will give the desired amount of silver, e. g., 3%, in the final catalyst and the solution will be entirely absorbed by the carrier or on its surfaces.

The preparation of such a catalyst is illustrated by the following example:

To prepare a silver catalyst containing about 3% of silver on the weight of the carrier, an amount of silver nitrate is weighed out equivalent to the amount of silver desired, and this is dissolved in a very small amount of water to form a strong solution, and to this solution is added just sufficient ammonia to precipitate the silver as oxide or hydroxide and to redissolve the precipitate. Thus, where the amount of solution required for applying the silver to the carrier is 10% of the weight of the carrier, the amount of the solution obtained on dissolving the silver nitrate, and after addition of the ammonia to precipitate and redissolve the precipitate, will be about 10 parts of solution containing 3 parts of silver. Where a larger or smaller amount of solution is desired for applying the ammoniacal silver to the carrier, the amount of water added to dissolve the silver nitrate can be correspondingly increased or decreased.

The ammonical solution of silver produced as described is a clear solution. This ammoniacal solution is added to the carrier in an amount sufficient to give approximately 3% of silver based on the weight of the carrier and in an amount of solution just sufficient to wet the surface of the carrier or to impregnate the carrier, without any appreciable excess of the ammoniacal solution. The carrier thus treated with the ammoniacal solution is dried, e. g., on a water bath for a suitable period of time, e. g., for about 2 to 4 hours, and the catalyst is then ready for its final treatment. The final treatment of the catalyst involves heating it to a temperature to decompose the complex ammoniacal compounds and to give the silver directly in catalytically active form. The temperature of heating is thus at about 250° C. to 350° C. for a sufficient period of time, e. g., 6 to 10 hours, more or less.

The catalyst thus obtained contains the silver in a particularly active form and a form which is particularly advantageous for the catalytic oxidation of ethylene.

The nature and advantages of the invention will be further illustrated by the following specific examples of the use of the catalyst in the catalytic oxidation of ethylene. In the following examples, the efficiency referred to is the percentage of ethylene consumed which is converted to ethylene oxide. In the examples, the term "space velocity" is used to indicate the number of displacements of the catalyst space per hours, that is, the relation of the total volume of gases passed through the space occupied by the catalyst to the volume of the catalyst space.

*Example 1.*—A catalyst prepared as above described and containing 3% of silver deposited on fragments of tabular corundum of ¼ by ½ inch size was placed in a stainless steel tube 5 feet long and ⅞ inch inside diameter and containing about 9 cubic inches of catalyst space. The tube was provided with electrical heating means for heating to the reaction temperature and with cooling means to avoid overheating by heat of reaction.

A gaseous mixture containing 11% oxygen, 5% ethylene, and the remainder mainly nitrogen was passed through the tube at a temperature of about 246° C. and at a space velocity of 288. The production of ethylene oxide was 1.39% at an efficiency of 68%.

In a similar way, gaseous mixtures containing about 11% of oxygen and proportions of ethylene varying from 4% to 9.5% were passed through the tube at space velocities varying from 277 to 596 and at temperatures varying from 177° C. to 246° C. The average efficiency of 26 runs thus carried out was 67%, with a maximum of 86.5%; and with an average production of ethylene oxide of 0.95% and a maximum production of 1.72%.

*Example 2.*—Another catalyst was prepared in the manner above described, containing 1.66% silver on ¼ inch spheres of Norton's Alundum. The gaseous mixture passed over the catalyst was air containing 5% of ethylene. And at a space velocity of about 355 and a temperature of about 262° C. the production of ethylene oxide was 1.67% at an efficiency of 71%.

In 12 runs similarly made with varying the percentage of ethylene, space velocity and temperature, an average for the 12 runs of 1.42% ethylene oxide was produced and a maximum of 1.67%; and the average efficiency was 69%, with a maximum efficiency of 78%.

*Example 3.*—Another catalyst was prepared as in Example 1, but containing 5% of silver. The gaseous mixture passed over the catalyst contained 3.3% of ethylene and the gaseous mixture was passed at a space velocity of about 469 and a temperature of about 266° C. The ethylene oxide produced was 1.01% at an efficiency of 77%.

In 31 runs made with this catalyst, with varying percentages of ethylene, varying space velocity and varying temperature, the average amount of ethylene oxide produced was 0.94%, with a maximum of 1.23%; and the average efficiency was 71%, with a maximum efficiency of 78½%.

*Example 4.*—Another catalyst was prepared as in Example 1, containing 5.5% of silver. Air containing 4.3% of ethylene was passed over the catalyst at a space velocity of 532 and a temperature of about 291° C., and gave 1.00% ethylene oxide at an efficiency of 69%.

In 20 runs made with this catalyst and with varying the ethylene, temperature and space velocities, an average of 0.90% of ethylene oxide was produced and a maximum of 1.4%; while an average efficiency was obtained of 70%, with a maximum of 87%.

*Example 5.*—Another catalyst was prepared as in Example 1, but containing 2.4% of silver. Air containing 5.3% of ethylene was passed over the catalyst at a space velocity of about 955 and a temperature of about 265° C., and gave 1.63% ethylene oxide and an efficiency of 70%.

In 16 runs made with this catalyst, with varying percentages of ethylene, space velocity and temperatures, an average production of 1.14% of ethylene oxide was obtained with a maximum of 1.63%; and with an average efficiency of 71.5% and a maximum of 86%.

The new silver catalyst produced in accordance with the present invention has the advantage that it is capable of operating over a considerable range of temperatures and with varying percentages of ethylene and with varying space velocities.

I claim:

The method of producing a silver catalyst without the use of a reducing agent which comprises applying to an inert metal oxide catalyst carrier a strong ammoniacal silver nitrate solution in amount sufficient to wet the surfaces of the carrier and to be absorbed thereby and containing from about 1.66% to about 5.5% of silver based on the weight of the carrier, drying the resulting product and heating the same to a temperature of about 250° to 350° C. to decompose the ammoniacal silver nitrate and to give the silver directly in catalytically active form.

References Cited in the file of this patent

UNITED STATES PATENTS

| | | |
|---|---|---|
| 906,229 | Hoessle | Dec. 8, 1908 |
| 2,424,083 | Finch et al. | July 15, 1947 |
| 2,431,427 | Schulze | Nov. 27, 1947 |
| 2,444,509 | Ipatieff | July 6, 1948 |
| 2,600,444 | Sullivan | June 17, 1952 |
| 2,622,088 | Thomas | Dec. 16, 1952 |